United States Patent [19]

Shiba

[11] 4,382,565

[45] May 10, 1983

[54] MAGNETIC TAPE CASSETTE

[75] Inventor: Haruo Shiba, Tokyo, Japan

[73] Assignee: TDK Electronics Co., Ltd., Tokyo, Japan

[21] Appl. No.: 229,016

[22] Filed: Jan. 27, 1981

[30] Foreign Application Priority Data

Mar. 25, 1980 [JP] Japan .............................. 55-39895[U]

[51] Int. Cl.³ ...................... B65H 23/04; G11B 15/32
[52] U.S. Cl. ............................. 242/199; 242/55.19 A; 242/197; 226/196
[58] Field of Search ................... 242/55.19 A, 76, 192, 242/194, 197–200; 360/93, 96, 132; 226/196

[56] References Cited

U.S. PATENT DOCUMENTS

| | | | |
|---|---|---|---|
| 3,751,043 | 8/1973 | Bracci | 242/199 X |
| 3,797,779 | 3/1974 | Esashi et al. | 242/199 |
| 4,304,374 | 12/1981 | Okamura et al. | 242/199 |

Primary Examiner—Leonard D. Christian
Attorney, Agent, or Firm—Oblon, Fisher, Spivak, McClelland & Maier

[57] ABSTRACT

A magnetic tape cassette has a tape pad for pushing the magnetic tape in the path of the magnetic tape. The tape pad comprises one piece of a tape contacting part and a spring member for supporting the tape contacting part which is made of a carbon-containing polymer having elasticity.

3 Claims, 6 Drawing Figures

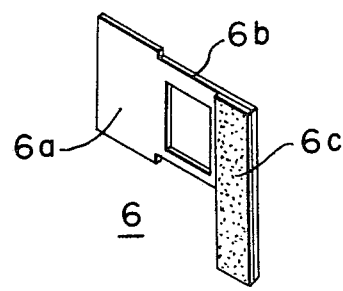
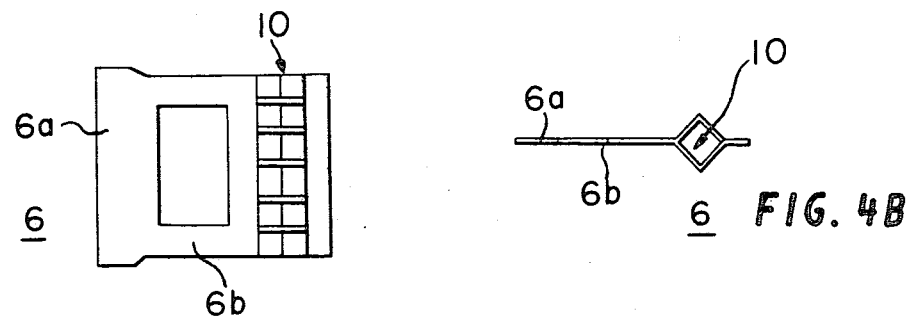
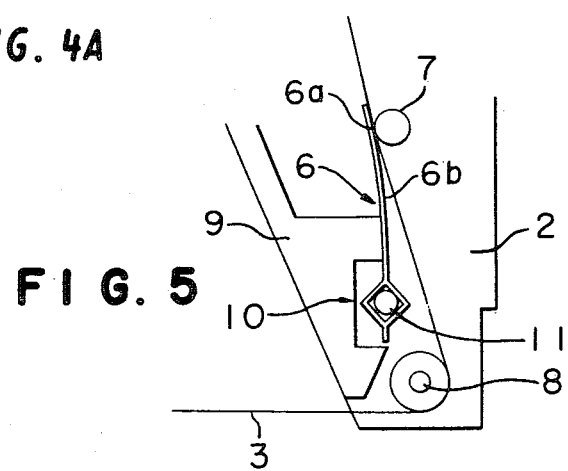

MAGNETIC TAPE CASSETTE

BACKGROUND OF THE INVENTION

1. Field of the Invention

The present invention relates to a magnetic tape cassette such as a video cassette.

2. Description of the Prior Art

As shown in FIG. 1, the magnetic tape cassette usually comprises a casing formed by an upper casing (1) and a lower casing (2); reels (4), (5) for winding and running a magnetic tape (3) in the casing; a tape pad (6) in the running path of the magnetic tape (3) between the reels (4), (5) so as to push the magnetic tape (3) by spring pressure of a spring member (6b) between a guide (7) and a tape contacting part (6a) of the tape pad (6), whereby the stable running of the magnetic tape (3) is maintained. In FIG. 1, the reference numeral (8) designates a guide pole.

FIG. 2 is an enlarged view of the structure of the conventional tape pad (6) wherein the tape contacting part (6a) is bonded at one end of the spring member (6b) made of elastic plate and a duplicated adhesive tape (6c) is bonded along the other end of the spring member (6b). One surface of the duplicated adhesive tape (6c) is bonded to the support connected to the lower casing (2) so as to assemble the tape pad (6) in the casings (1), (2).

The spring member (6b) should be made of a substrate having elasticity so as to apply suitable pressure to the magnetic tape (3). The tape contacting part (6a) should be made of a substrate having low friction and low wearing property so as to prevent friction damage of the magnetic tape (3) under the condition applying the spring pressure of the spring member (6b) to the magnetic tape (3). In the conventional structure, the spring membrane is formed by an elastic plate made of polyethyleneterephthalate etc. The tape contacting part (6a) is made of a substrate having low friction and low wearing property such as graphite and polytetrafluoroethylene. They are bonded each other with the duplicated adhesive tape (6d).

Therefore, the conventional tape pads have the following disadvantages.

(1) The spring member and the tape contacting part should be separately prepared and combined whereby the assembling operation is complicate to cause high cost.

(2) The spring member (6b) is bonded to the tape contacting part (6a) with the duplicated adhesive tape (6d) whereby the tacky adhesive of the duplicated adhesive tape (6d) is squeezed from the bonded part and is adhered on the surface of the magnetic tape (3) to cause a trouble for magnetic recording and a trouble for running etc.

SUMMARY OF THE INVENTION

It is an object of the present invention to overcome the disadvantages of the conventional device and to provide a magnetic tape cassette which comprises a tape pad which is economical and does not cause a trouble of squeeze of the tacky adhesive of the adhesive tape.

The foregoing and other objects of the present invention have been attained by providing a magnetic tape cassette having a tape pad for pushing the magnetic tape in the path of the magnetic tape, held in a casing, wherein the tape pad has one piece of a tape contacting part and a spring member for supporting the tape contacting part which is made of a carbon-containing high density polyethylene.

BRIEF DESCRIPTION OF THE DRAWINGS

FIG. 3 is a front view of a tape pad used for the magnetic tape cassette according to the present invention;

FIG. 4(A) is a front view of the other embodiment of the present invention;

FIG. 4(B) is a plane view of the embodiment; and

FIG. 5 is a partially sectional view for showing the assembly of the tape pad shown in FIG. 4.

DETAILED DESCRIPTION OF THE PREFERRED EMBODIMENTS

Figure 1:
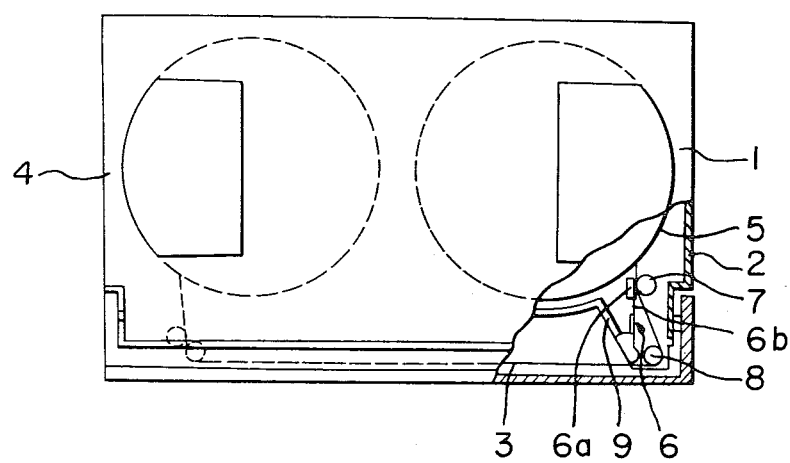
FIG. 1 is a partially sectional view of the conventional magnetic tape cassette.
Figure 2:
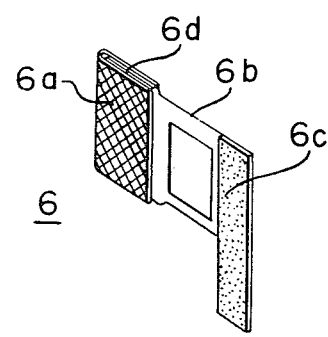
FIG. 2 is a schematic view of the tape pad used in the conventional magnetic tape cassette.

Referring to the drawings, the embodiments of the present invention will be illustrated in detail.

FIG. 3 is a schematic view of the tape pad used in the present invention. In the structure of the embodiment of the present invention, the tape contacting part (6a) and the spring member (6b) are formed in one piece by molding into one body, though they have been formed to be two parts in the conventional embodiment. The reference (6c) designate a duplicated adhesive tape.

In accordance with such structure, it is unnecessary to assemble the tape contacting part (6a) and the spring membrane (6b) as two parts by preparing them separately whereby the processes are simplified to be economical costs for the preparation and assembly. Moreover, it is unnecessary to use an adhesive tape etc. for bonding the tape contacting part (6a) to the spring membrane (6b) whereby the trouble caused by the squeeze of the adhesive can be completely prevented. In the molding of the tape contacting part (6a) and the spring membrane (6b) in one piece, the composition obtained by blending carbon to high density polyethylene is used for the molding. When such composition is used for the molding in one piece, the same spring elasticity as the spring elasticity of the conventional polyethyleneterephthalate is given and the tape contacting part (6a) can be the tape contacting part having low friction and low wearing property in comparison with the conventional graphite or polytetrafluoroethylene.

Moreover, carbon is blended, whereby the frictional electric charge of the magnetic tape is prevented whereby the adhesion of dust to the magnetic tape (3) can be prevented. The content of carbon is preferably controlled to give a volume resistivity of less than $10^5 \Omega$-cm as the tape pad. The spring member can be made of the other carbon-containing polymer having suitable elasticity.

Referring to FIGS. 4(A) and (B), the other embodiment of the tape pad of the present invention will be illustrated. In the feature of the embodiment, a fitting hollow (10) is formed at the end of the spring member (6b) instead of the duplicated adhesive tape (6c) as shown in FIG. 3 by a press-bending by alternatively bending cut parts of the spring plate in different sides to form the pair of convex parts. The sectional view of the hollow is substantially rectangular. The structure of the fitting hollow can be modified as desired. For example, one end of the spring member can be bent in a cylindrical shape or a rectangular shape along the side line to form the fitting hollow. As shown in FIG. 5, the supporting part (11) mounted on the casing (2) is inserted into the fitting hollow (10) so as to support the tape pad (6). The embodiment is superior to the structure of the assembly using the duplicated adhesive tape (6c) in view of the easy assembling operation, the capability of assembly by an automatic assembling machine and the complete prevention of the vertical slip of the tape pad or the peeling-off of the tape pad during and after the assembly as the excellent advantageous effects.

As described above, in accordance with the present invention, the magnetic tape cassette has the tape pad press-contacting with the magnetic tape in the path for running the magnetic tape in the casing, and the tape contacting part and the spring member for supporting the tape contacting part of the tape pad is formed in one piece made of a composition of carbon containing high density polyethylene. Therefore, the following advantages can be expected.

(1) The tape pad can be one part whereby the preparation and assembly of the tape pad are simplified to be low costs for the preparation and assembly and the product;

(2) The adhesive tape for bonding the tape contacting part to the spring member can be eliminated whereby the magnetic recording trouble, the adhesion of dust and the running trouble which are caused by the adhesion of the adhesive on the magnetic tape can be completely prevented;

(3) The tape pad is formed by the composition of the carbon-containing high density polyethylene whereby the same spring elasticity as the conventional polyethyleneterephthalate can be given and the tape contacting part having the same low friction and low wearing as those of the graphite and polytetrafluoroethylene in the conventional parts; and the frictional electric charge of the magnetic tape can be prevented to prevent the adhesion of dust on the magnetic tape;

(4) In the structure of the latter embodiment forming the fitting hollow at the end of the tape pad and assembling the tape pad in the casing by using the fitting hollow, the assembly operation can be simplified to be capable of assembly by the automatic assembling machine and the troubles of the vertical slip of the tape pad or the peel-off of the tape pad during and after the assembly can be completely prevented to improve the reliability.

I claim:

1. A tape biasing element for a magnetic tape cassette enclosing a magnetic tape movably held in a casing, said tape biasing element comprising a unitarily formed single molded element including a spring portion and a tape contacting portion, said tape biasing element being formed of a resilient material comprising high density polyethylene blended with carbon, whereby said unitarily formed element provides both the resiliency necessary for said spring portion and the low friction necessry for said tape contacting portion.

2. The tape biasing element of claim 1 wherein said casing includes a supporting part, wherein said tape biasing element includes a fitting hollow, and wherein said supporting part is held within said fitting hollow.

3. The tape biasing element according to claim 1, wherein the content of carbon is controlled to give a volume resistivity of lower than $10^5 \Omega$-cm.

* * * * *